Aug. 22, 1967   D. H. ALDEBORGH   3,336,676

REFERENCE MASTER FOR DIAL BORE GAGES

Filed July 20, 1965

INVENTOR
DAVID H. ALDEBORGH

BY *Darby & Darby*

ATTORNEYS

United States Patent Office 3,336,676
Patented Aug. 22, 1967

3,336,676
REFERENCE MASTER FOR DIAL BORE GAGES
David H. Aldeborgh, Poughkeepsie, N.Y., assignor to Standard Gage Company, Inc., Poughkeepsie, N.Y., a corporation of New York
Filed July 20, 1965, Ser. No. 473,297
8 Claims. (Cl. 33—178)

The present invention relates to dial bore gages and particularly to reference or setting masters for setting such bore gages to a given dimension and checking such setting.

As is well known, dial bore gages are utilized to gage the diameter of a bore in a work piece and must, in order to perform this function, be set to a known dimension so that the deviation from the required dimension can be determined by the gage.

Many methods of setting bore gages to the required dimension have been utilized as for example a ring gage manufactured particularly for the work at hand and having a bore therein which is exactly that required. Such ring gages are expensive and therefore other methods have been developed such for example as that shown in Patent No. 2,933,815 issued Apr. 26, 1960 to the assignee of the present application.

The dial bore gage setting master of the above identified patent is preferable to a ring gage in that it is usable to set dial bore gages to a variety of required dimensions. However, this setting master is also relatively expensive and is not in general suited to use on the production line.

My present invention provides an adjustable setting or reference master for dial bore gages which is of such size and configuration and sufficiently rugged in construction to be suitable for use on the production line and is at the same time relatively low in cost and thus available in sufficient numbers for production usage.

Additionally, it is provided with means whereby it can be set and sealed and thereby rendered tamper proof while at the same time it can readily be reset without undue difficulty.

It is an object of the invention to provide a dial bore gage reference master which can readily be set and locked in a set position thereby rendering it tamper proof.

It is another object to provide such a reference master which can be set to any dimension over a relatively large range of dimensions, the setting being performed with relative ease.

It is another object of the invention to provide such a gage which is sufficiently rugged so that it can be used on the production line.

It is a further object of the invention to provide such a gage which is of such a size and configuration as to be readily handled by the machine tool operator on the production floor and is of sufficiently small size and bulk to enable such operation with ease.

It is a still further object to provide a bore gage reference master having all of the advantages listed above and which may nonetheless be produced at low cost.

Other objects and features of the invention will be apparent when the following description is considered in connection with the annexed drawings, in which, FIGURE 1 is a front elevational view of the dial bore gage reference master of this invention with portions thereof in section. In this view the gaging head of a dial bore gage is shown in dotted outline;

Figure 1:
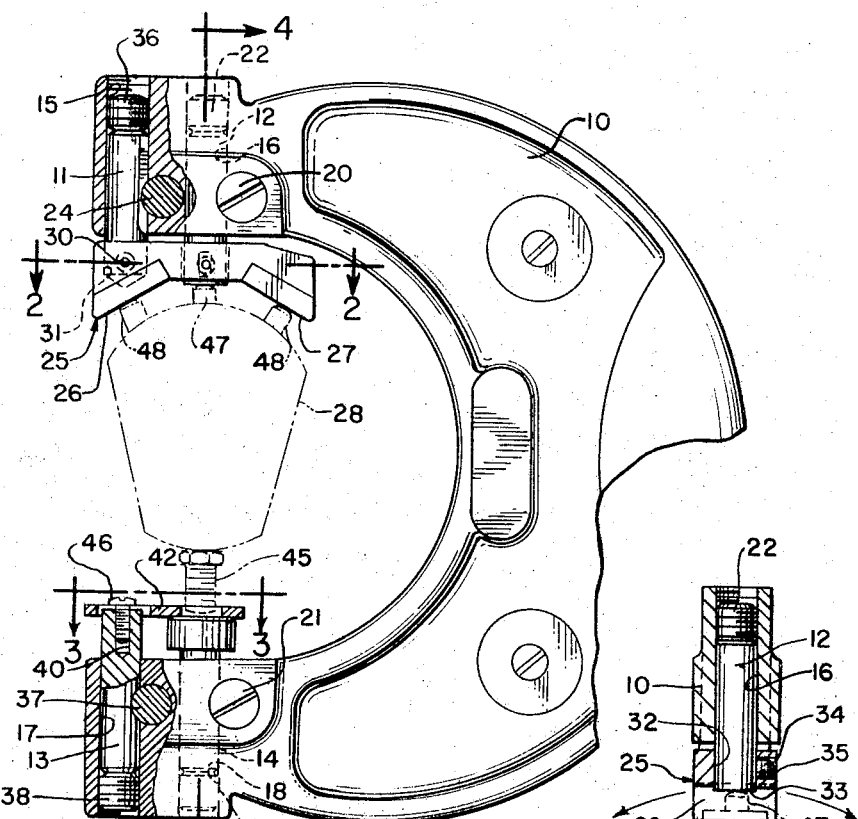

The dial bore gage reference master of the present invention utilizes as a basic element of its construction an American Gage Design adjustable type snap gage frame which provides the requisite ruggedness, sealability against tampering and low cost, and which has additionally been accorded widespread acceptance by manufacturing companies throughout United States.

Since the adjustable limit snap gage is a relatively crude instrument, being manufactured to tolerances of fractions of an inch, and since a dial bore gage must be set much more accurately than is possible with fractional tolerances, means are provided by this invention whereby the components added to the snap gage to convert it to a dial bore gage reference master, provide for positioning the bore gage between a pair of anvils of the "go-no go" snap gage with such exactitude that the bore gage can be accurately read to one ten thousandth (0.0001) inch.

The basic requirements of an adjustable dial bore gage reference master are that there be two flat surfaces facing each other of which at least one must be adjustable toward and away from the other, one of these surfaces engaging the measuring plunger and the other the reference contact of the dial bore gage; that there be some retaining device which will engage the reference contact of the bore gage and hold it in a predetermined position while the gage is being rocked to secure a minimum reading, i.e., a true diameter; and that there be a V block or similar device which engages the centralizing contacts of the bore gage and assures that the measuring and reference contacts lie on a diameter of a circle in a plane transverse to the bore axis when the gage yields a minimum reading or in other words a V block or like device which assures that the measuring plunger and reference contact together measure a diameter of a circle rather than a chord thereof.

Referring now to the drawings, it will be seen that the reference master shown therein and hereinafter described meets the requirements set forth above.

As shown in FIGURE 1, the dial bore gage reference master comprises a U-shaped frame 10 which is the same frame which is used in known American Gage Design Model B snap gages. The gage frame 10 is provided with upper gaging pins 11 and 12 and lower gaging pins 13 and 14. The gaging pins 12 and 14 are substantially identical with the gaging pins of the corresponding size AGD snap gage, the facing surfaces of these gaging anvils being flat and parallel to each other.

As in the snap gage, gaging pins 12 and 14 are prevented from rotating in their respective bores 16 and 18 thus assuring that the faces of the pins or anvils remain parallel irrespective of their adjustment. The gaging pins 12 and 14 are locked in position in the usual manner by means of the locking screws 20 and 21 which in the usual manner are arranged to clamp flatted surfaces of the gaging pins between matching bevelled surfaces formed on members through which the locking screws are threaded. The gaging pins 12 and 14 are additionally provided with backup screws 22 and 23 respectively which are threaded into tapped portions of the bores 16 and 18 and seat against the ends of the gaging pins 12 and 14 to prevent their movement as gaging operations are performed and pressure thus exerted upon them.

The upper gaging pin 11 in the structure of this invention is guided for movement in the bore 15 in the usual manner and is locked in position by means of the locking screw 24. However, this gaging pin is modified and is used as a support for a V block 25, the surfaces 26 and 27 of which guide a bore gage such as indicated at 28 to assure that when the gage is rocked to secure a minimum reading that reading is a reading of a diameter rather than of a chord of the true circumference of the bore.

Figure 2:
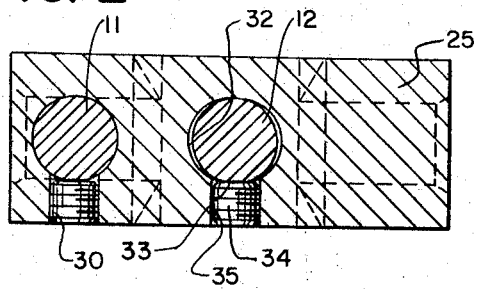
FIGURE 2 is a horizontal cross-sectional view taken on the plane of the line 2—2 of FIGURE 1.

The V block is rigidly fixed to the pin 11 in any suitable manner as for example by means of the screw 30. The V block 25 is, in addition to being provided with a blind bore 31 into which the pin 11 extends, provided with an opening 32 through which the gaging pin 12 extends. In order to give additional support for the V block 25 a flat 33 is formed on the end of the pin 12 and a setscrew 34 threaded into a hole 35 in the V block bears against this flat surface. As will be apparent from FIGURE 2 the aperture 32 in the V block is oval in shape to assure that no stress is placed on the parts in any adjusted position thereof. As indicated hereinabove the tolerances to which the gage frame including the bores 15, 16, 17, 18 is made are such that there is a possibility that the bores for the gaging pins are not exactly parallel and consequently were the aperture 32 round there might be stress exerted either upon the gaging pin 12 or the centralizing block 25 or both.

The position of the centering block is adjustable in the same manner as that of the gaging pin 12 and a backup screw 36 is provided to assure that pressure upon the centering block will not move that block from its adjusted position.

The lower rearward gaging pin 14 is, as has already been described, substantially identical with the usual snap gage gaging pin and is adjusted and held in its adjusted position in a manner already described in connection with pins 11 and 12. This gaging pin forms the lower reference point and cooperates with the flat face of gaging pin 12 to form the means for setting a bore gage to the desired dimension.

Figure 3:
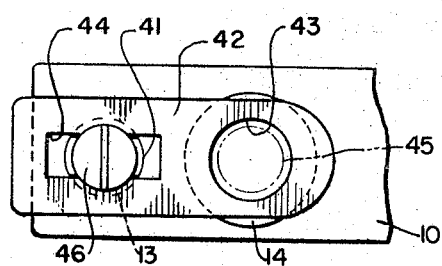
FIGURE 3 is a top plan view of the lower gaging anvil and centering means for the bore gage fixed or reference contact, the view being taken on the plane of the line 3—3 of FIGURE 1.
Figure 4:
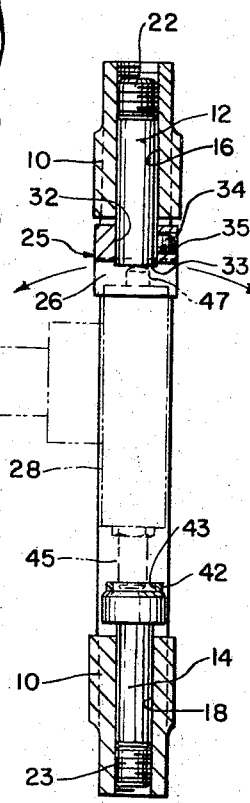
FIGURE 4 is a vertical cross-sectional view of the reference master of FIGURE 1, the section being taken on the plane of the line 4—4 of that figure.

The lower forward gaging pin 13 of this invention is a modified structure. It is generally similar to the usual snap gage pin with respect to being slidably mounted in the bore and locked by the conventional locking screw here designated 37 and is provided with the conventional backup screw 38. At its upper end, however, the gaging pin 13 is modified in the manner shown in FIGURES 1 and 3. The pin is slightly longer than usual and has a central tapped hole in its upper face as indicated at 40 and has portions of its upper face cut away to provide an upstanding generally rectangular portion 41 (FIGURE 3).

Mounted on the upper end of pin 13 is a guide plate 42 which plate has an aperture 43 therein and slides over the face of the gaging pin 14. In addition, the guide plate 42 is provided with a rectangular opening 44 which cooperates with the upstanding portion 41 of the pin 13 to guide the plate for movement in a forward and rearward direction in a substantially horizontal plane as seen in the drawings.

The aperture 43 in the guide plate 42 serves to locate the fixed or reference contact 45 of a dial bore gage with respect to the gaging pin 14 and provides a means whereby the setting of a bore gage can be repeatedly and accurately checked as will be more apparent when the description of the operation of setting the master and of utilizing the master in setting and checking production gages is explained. Additionally, since the pin 13 is not provided with the usual locking flats the locking arrangement including screw 37 permits rotation and thus the guide plate 42 may rotate to thus locate the aperture in a different position along the gage pin surface. Since it is clear that the arcuate movement about the pin 14 is substantially at right angles to the reciprocatory movement made possible by the rectangular slot in the guide plate 40, it is likewise clear that the aperture 43 may be located at any desired position on the surface of the gage pin 14.

Although the bore gage reference master of this invention may be set through the use of a stack of gage blocks in the usual manner, in view of the critical accuracy to which dial bore gages are frequently required to operate it is preferable to set the reference master in the following manner.

(1) First set a dial bore gage to the required dimension using a ring master or another type of dial bore gage setting master such as that disclosed in Patent No. 2,933,813.

(2) Remove the guide plate 42 and the V block 25 from the reference master. The former is of course done by removing the screw 46 which holds the guide plate in place on the pin 13 and then removing the plate 42. The latter is done by loosening the locking screw 24 and removing the pin 11 with the V block 25.

(3) Loosening the locking screw 20 or 21 or both and using the preset dial bore gage, adjust the position of either the upper or lower gaging pin 12 or 14 or both so that when the dial bore gage has its reference contact such as 45 on the lower gaging pin 14 and has rocked through as 45 the minimum position with the measuring contact 47 against the face of the upper pin 12, the gage reads zero. Of course the zero setting of the dial bore gage indicator is not disturbed.

(4) Install the V block assembly so that the pressure on the centralizing pins 48 of the dial bore gage is adequate to assure that these centralizing pins will position the gage on the diameter.

(5) Install the guide plate 42 and then place the contact 45 of the bore gage on the face of the lower gaging pin through the opening 43 in the guide plate, rock the gage to zero position. If the zero minimum reading cannot be attained loosen the screw 46 and readjust the guide plate until a zero reading is attained.

(6) The reference master is now adjusted and production dial bore gages may be set thereto and checked from time to time as desired. As is usually done with snap gages the backup screws 22, 23, 36 and 38 are positioned to bear against the outer ends of the corresponding pins and sealing wax is placed in the bores to prevent tampering. Usually the setting of the reference master is done in the gage room by one who is skilled in gage setting.

It will be understood that the reference master described above is operable over a limited range of dimensions only and that reference masters for other ranges are provided by utilizing standard snap gage frames for the corresponding ranges.

While the foregoing describes my invention it will be clear that modifications may be readily made as for example the front and back gaging pins may be interchanged. Also, of course, a preferred manner of use has been described and other modes may be utilized. I wish, therefore not to be limited by the description, but on the other hand to be limited only by the appended claims.

What is claimed is:

1. In a dial bore gage reference master, in combination, a U-shaped frame of the snap gage type having means in each arm thereof adapted to adjustably mount a pair of pins, a first gaging pin mounted in the mounting means of the first arm of said frame, a second gaging pin mounted in the corresponding mounting means of the second arm of said frame, a generally V shaped centralizing block mounted on said first frame arm, an opening in said block through which said first gaging pin extends, the V forming surfaces of said block lying on opposite sides of said first gaging pin and a guide plate having an aperture therein mounted on said second frame arm, said plate resting on the face of said second gaging pin and being adjustable to place said aperture in a desired position on the face of said pin.

2. A device as claimed in claim 1 wherein said opening in said centralizing block is oval and wherein means are provided for locking said block in an adjusted position on said first gaging pin.

3. A device as claimed in claim 2 wherein said locking means comprises a flat surface on said first gaging pin and a setscrew extending through said block into said oval opening and into contact with said flat surface.

4. A device as claimed in claim 1 wherein each said pin mounting means comprises a bore through the corresponding frame arm, all said bores being substantially parallel to each other and wherein said first and second gaging pins are adjustably mounted in said bores in alignment with each other and with their gaging surfaces facing each other and wherein said centralizing block is fixed to a pin mounted in the second bore of the first frame arm and said guide plate is mounted upon a pin in the second bore of the second frame arm.

5. A device as claimed in claim 4 wherein said mounting for said guide plate comprises an upstanding substantially rectangular portion formed on the end of said mounting pin, said guide plate having a mating rectangular slot therein to permit adjustment of said guide plate across the face of said second gaging pin.

6. A device in accordance with claim 5 wherein means are provided for locking said guide plate in an adjusted position on said pin.

7. A device in accordance with claim 6 wherein said guide plate locking means comprises a screw threaded into a tapped opening in the end of said mounting pin, the head of said screw bearing against the upper surface of said guide plate adjacent the side edges of said rectangular slot.

8. In a dial bore gage reference master in accordance with claim 7, wherein each said frame bore is provided with means for locking a pin in adjusted position therein and wherein a backup screw is provided for each pin to assure that there be no movement of said pin when pressure is applied axially thereof.

No references cited.

LEONARD FORMAN, *Primary Examiner.*

S. S. MATTHEWS, *Assistant Examiner.*